United States Patent
Thomas et al.

(10) Patent No.: US 11,245,818 B2
(45) Date of Patent: Feb. 8, 2022

(54) CAMERA EXPANSION FRAMES AND MODULES

(71) Applicant: GoPro, Inc., San Mateo, CA (US)

(72) Inventors: Matthew David Thomas, Castro Valley, CA (US); Jordan Todd, Piedmont, CA (US); Scott Alberstein, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/907,886

(22) Filed: Jun. 22, 2020

(65) Prior Publication Data

US 2021/0021738 A1    Jan. 21, 2021

Related U.S. Application Data

(63) Continuation of application No. 16/240,106, filed on Jan. 4, 2019, now Pat. No. 10,694,083.

(51) Int. Cl.
*H04N 5/225* (2006.01)
*G03B 17/08* (2021.01)
*G03B 17/56* (2021.01)

(52) U.S. Cl.
CPC .......... *H04N 5/2252* (2013.01); *G03B 17/08* (2013.01); *G03B 17/56* (2013.01); *G03B 2206/00* (2013.01)

(58) Field of Classification Search
None
See application file for complete search history.

(56) References Cited

U.S. PATENT DOCUMENTS

| 5,092,458 | A | 3/1992 | Yokoyama | |
|---|---|---|---|---|
| 6,138,826 | A | 10/2000 | Kanamori | |
| 8,736,753 | B2 * | 5/2014 | Kaga | G03B 13/02 |
| | | | | 348/373 |
| 8,792,050 | B2 * | 7/2014 | Shinohara | G03B 17/14 |
| | | | | 348/373 |
| 9,383,628 | B1 | 7/2016 | Coons | |
| 2007/0268371 | A1 * | 11/2007 | Misawa | H04N 5/23203 |
| | | | | 348/207.99 |
| 2010/0060747 | A1 * | 3/2010 | Woodman | G03B 17/08 |
| | | | | 348/222.1 |
| 2012/0262618 | A1 * | 10/2012 | Weakly | A45C 11/22 |
| | | | | 348/333.01 |

(Continued)

OTHER PUBLICATIONS

International Search Report and Written Opinion issued in PCT/US2020/012030, dated Apr. 16, 2020, 10 pages.

(Continued)

*Primary Examiner* — James M Hannett
(74) *Attorney, Agent, or Firm* — Young Basile Hanlon & MacFarlane, P.C.

(57) ABSTRACT

A frame for an image capture device includes a frame body configured to receive and secure the image capture device, a frame I/O interface configured to mate with an imaging I/O interface of an image capture device when the image capture device is secured within the frame body, a frame interface seal configured to provide waterproofing between the frame body and the image capture device when the frame I/O interface and the imaging I/O interface are mated, and a frame accessory integrated into the frame body and configured to communicate with the image capture device when the frame I/O interface and the imaging I/O interface are mated.

20 Claims, 9 Drawing Sheets

(56) References Cited

U.S. PATENT DOCUMENTS

| | | | |
|---|---|---|---|
| 2014/0353178 A1* | 12/2014 | Kim | ................ B65D 25/54 |
| | | | 206/37 |
| 2016/0062217 A1 | 3/2016 | Slater | |
| 2017/0078537 A1 | 3/2017 | Peddecord | |
| 2017/0339319 A1 | 11/2017 | Woodman | |
| 2018/0095343 A1 | 4/2018 | Wroblewski | |
| 2019/0278960 A1* | 9/2019 | Russell | ................ G06K 7/089 |

OTHER PUBLICATIONS

Wasabi Power Extended Battery for GoPro HERO7/HERO6/HERO5/HERO 2018 | 2500mAh: URL: https://www.herogear.com.au/wasabi-power-extended-battery-for-gopro-hero7-hero; retrieved on Jan. 14, 2019, 21 pages.

* cited by examiner

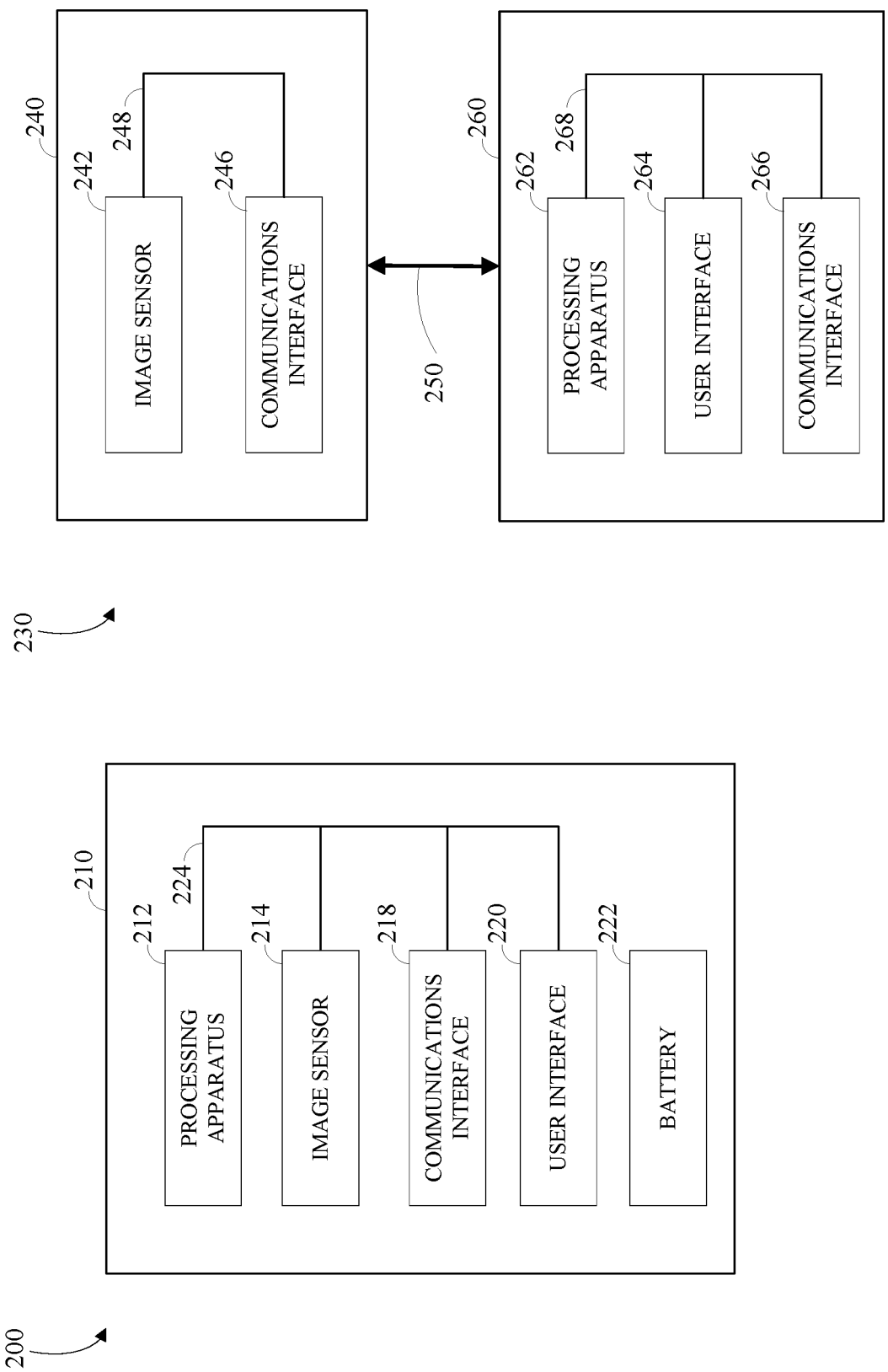

CAMERA EXPANSION FRAMES AND MODULES

CROSS REFERENCE TO RELATED APPLICATION(S)

This application is a continuation of U.S. application Ser. No. 16/240,106, filed Jan. 4, 2019, the contents of which is incorporated by reference herein in its entirety.

TECHNICAL FIELD

This disclosure relates to frames and expansion modules, and more specifically, to camera frames and expansion modules that add expanded features to existing image capture devices.

BACKGROUND

Photography during physical activity has been improved by use of simple-to-operate, lightweight, compact cameras. These cameras can be used hands-free, for example, using a combination of voice commands and mounts, harnesses, and/or straps to secure the camera to a desired location. These simple-to-operate cameras can be designed without a large number of features to further reduce weight and complexity of operation. The lack of features does not negatively impact many photographers that use the simple-to-operate camera. However, some photographers may want to expand capability and/or functionality of the simple-to-operate camera in some situations.

SUMMARY

Disclosed herein are implementations of camera frames and expansion modules.

In one embodiment, a frame for an image capture device includes a frame body configured to receive and secure the image capture device, a frame I/O interface configured to mate with an imaging I/O interface of the image capture device when the image capture device is secured within the frame body, a frame interface seal configured to provide waterproofing between the frame body and the image capture device when the frame I/O interface and the imaging I/O interface are mated, and a frame accessory integrated into the frame body and configured to communicate with the image capture device when the frame I/O interface and the imaging I/O interface are mated.

In one embodiment, a frame for an image capture device includes a frame body configured to receive and secure the image capture device and a frame communication interface. The frame communication interface is configured to slidably mate with an imaging communication interface of the image capture device when the image capture device is secured within the frame body. When mated, the frame communication interface and the imaging communication interface facilitate one or more of power and data communications between the frame and the image capture device. The frame includes a frame accessory communication interface. The frame accessory communication interface is configured to mate with an accessory communication interface associated with an imaging accessory. When mated, the frame accessory communication interface and the accessory communication interface facilitate one or more of power and data communications between the frame or the image capture device and the imaging accessory.

In one embodiment, a system includes an image capture device and a frame. The image capture device includes a housing, an imaging communication interface, and an access door removably coupled to the housing such that a user is allowed access to the imaging communication interface when the access door is in an open position or a removed position. The frame includes a frame body configured to receive and secure the image capture device, wherein the frame body has an open position for slidably receiving and removing the image capture device, and wherein the frame body has a closed position for securing the image capture device within the frame body when the access door is in the removed position. The frame includes a frame accessory disposed in the frame body and a frame communication interface, wherein the frame communication interface slidably mates with the imaging communication interface when the image capture device is secured within the frame body, and wherein the mated interfaces facilitate one or more of power and data communications between the frame accessory and the image capture device.

In one embodiment, a system includes an image capture device. The image capture device includes a housing comprising retention features; a battery; an imaging communication interface; and an access door comprising access fastening structures removably coupling the access door to the retention features of the housing. The access door has a closed position where the access door is coupled to the housing by the access fastening structures coupling the retention features and the user is prohibited access to the battery and the imaging communication interface by the access door. The access door has a removed position where the access fastening structures are separated from the retention features and the user is allowed access to the battery and the imaging communication interface.

The system also includes an expansion module. The expansion module includes an expansion accessory; expansion fastening structures that removably couple the expansion module to the retention features in place of the access fastening structures when the access door is in the removed position; and an expansion communication interface that slidably mates with the imaging communication interface.

In one embodiment, an expansion module includes an expansion accessory and expansion fastening structures that removably couple the expansion module to retention features of a housing of an image capture device when an access door of the image capture device is in a removed position. The expansion module also includes an expansion communication interface that couples an imaging communication interface of the image capture device when the access door of the image capture device is in the removed position. The retention features include hinge structures and cavities defined in the housing of the image capture device. The expansion fastening structures comprise hinge structures and latch structures that engage the retention features of the housing of the image capture device.

In one embodiment, a system includes an image capture device. The image capture device includes a housing; a battery; an imaging communication interface; and an access door removably coupled to a side of the housing. The access door has a closed position where the access door is coupled to the housing of the image capture device and the user is prohibited access to the battery and the imaging communication interface by the access door. The access door has a removed position separating the access door from the housing of the image capture device and the user is allowed access to the battery and the imaging communication interface.

The system also includes a frame. The frame includes a frame body that engages sides of the housing of the image capture device when the access door in the removed position. The frame body has an open position for slidably receiving and removing the image capture device, and the frame body has a closed position for securing the image capture device within the frame body. The frame also includes a frame communication interface. The frame communication interface slidably mates with the imaging communication interface when the image capture device is secured within the frame body, and the mated interfaces facilitate power and data communications between the frame and the image capture device.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 2A-B are block diagrams of examples of image capture systems.

DETAILED DESCRIPTION

Figure 1A:
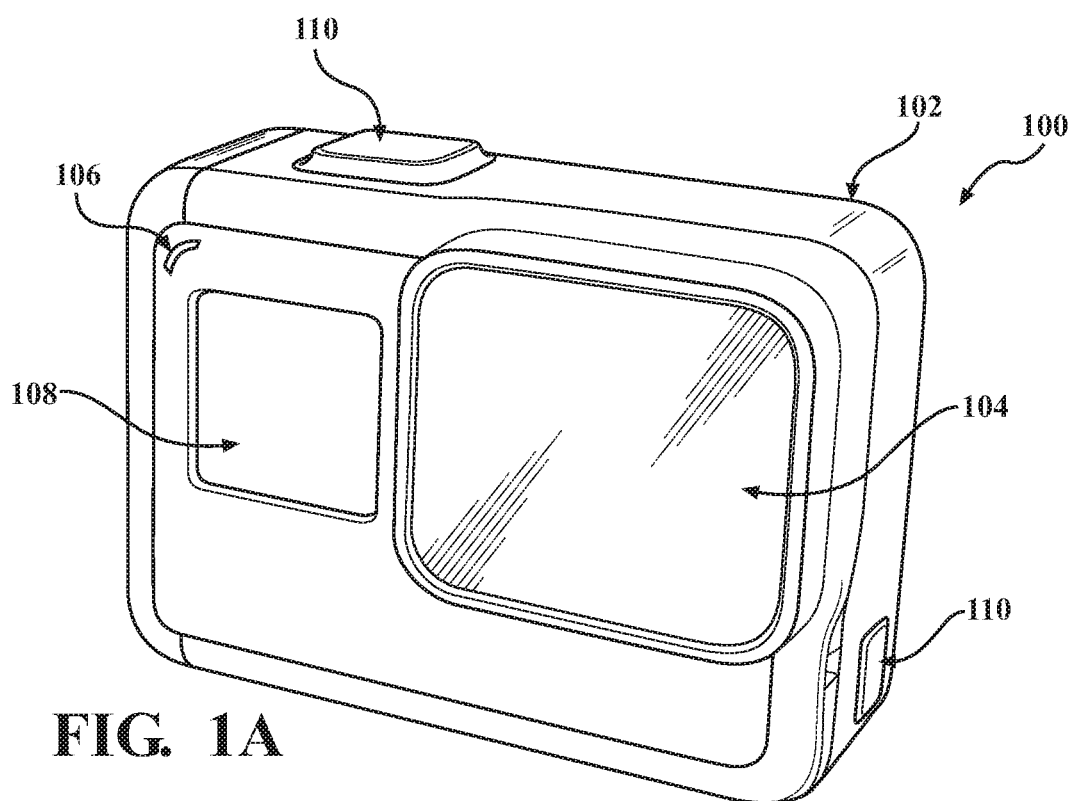
FIGS. 1A-D are isometric views of an example of an image capture device.

Camera expansion frames and camera expansion modules can be used with image capture devices to provide additional features or functionality to an image capture device. Expanded functionality can be achieved using integrated frame accessories, cold-shoed imaging accessories, and/or securely-coupled expansion accessories that attach to retention features on a body or housing of an image capture device. Communication between the various accessories and the image capture device can be achieved through mated I/O interfaces as described below.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
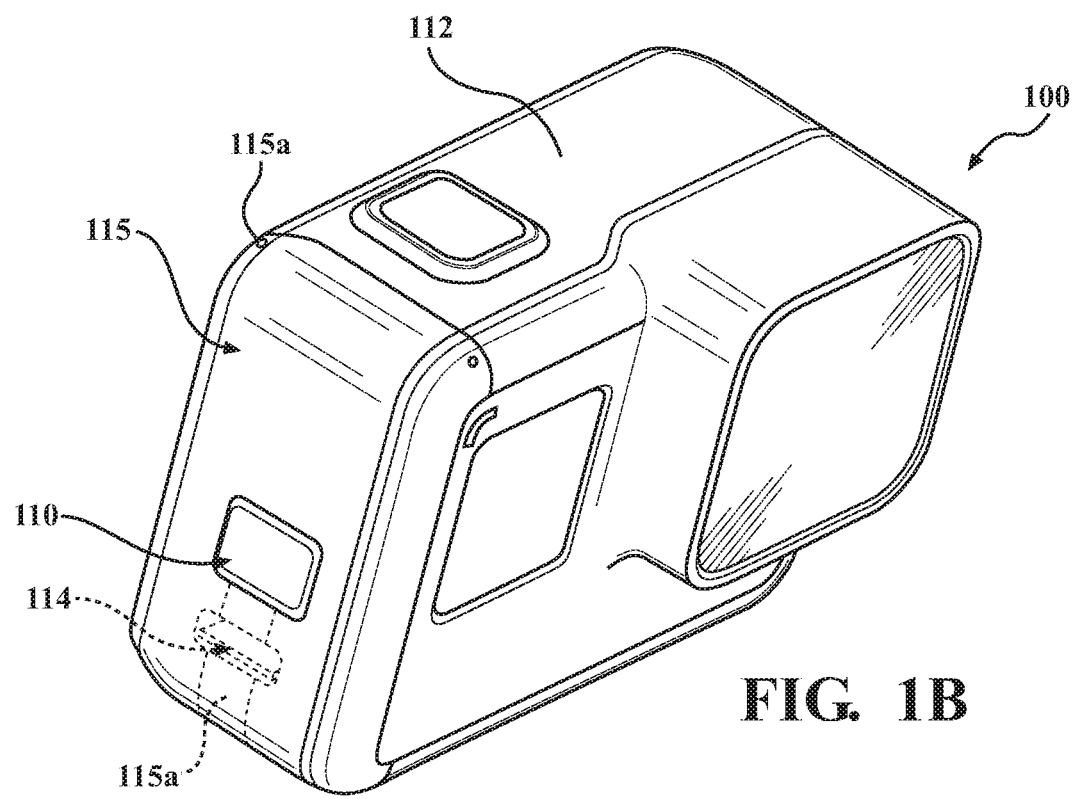
Figure 1C:
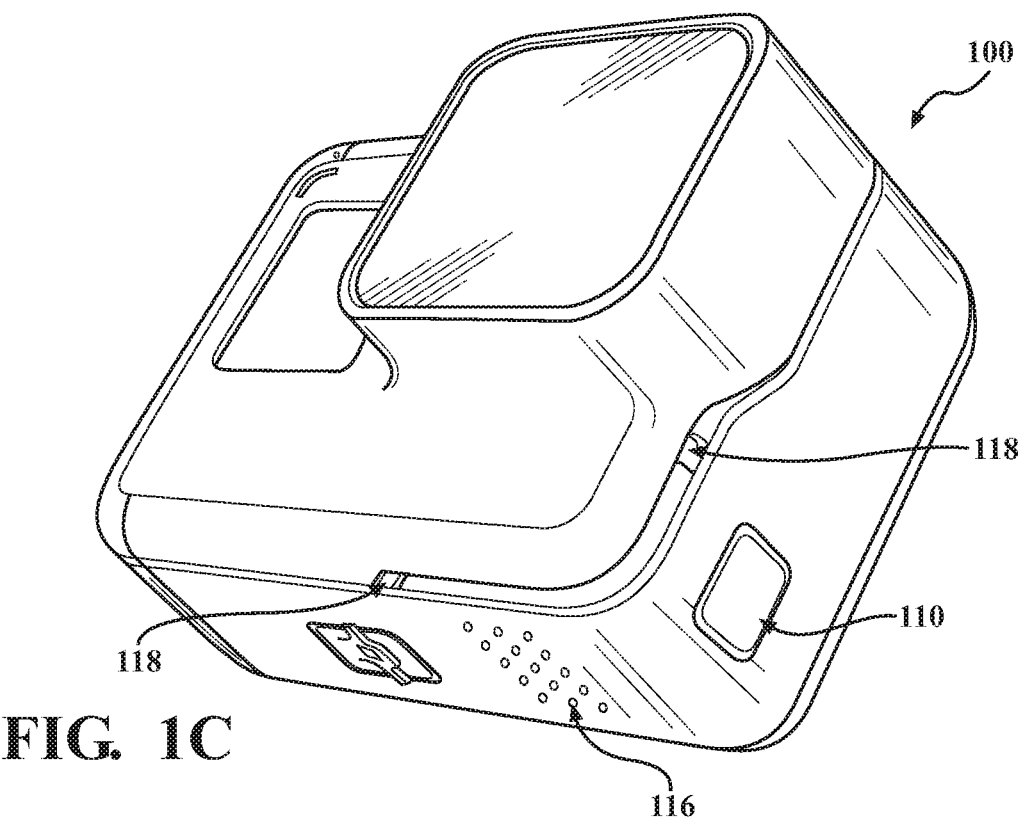
Figure 1D:
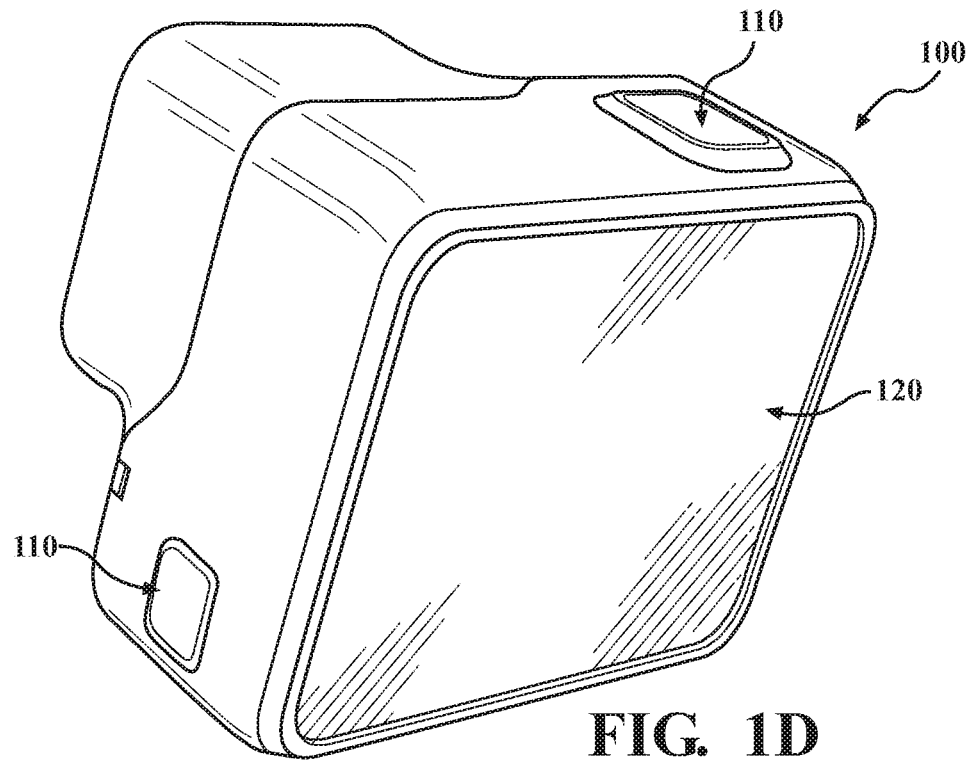

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects the internal electronics which are further described in later sections. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (e.g., the I/O interface 114). The user interface device may, for example, be the personal computing device 260 described below with respect to FIG. 2B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

FIGS. 2A-B are block diagrams of examples of image capture systems. Referring first to FIG. 2A, an image capture system 200 is shown. The image capture system 200 includes an image capture device 210 (e.g., a camera or a drone), which may, for example, be the image capture device 100 shown in FIGS. 1A-D.

The image capture device 210 includes a processing apparatus 212 that is configured to receive an image from an image sensor 214. The processing apparatus 212 may be configured to perform image signal processing (e.g., filtering, tone mapping, stitching, and/or encoding) to generate output images based on image data from the image sensor 214. The image capture device 210 includes a communications interface 218 for transferring images to other devices. The image capture device 210 includes a user interface 220 to allow a user to control image capture functions and/or view images. The image capture device 210 includes a battery 222 for powering the image capture device 210. The components of the image capture device 210 may communicate with each other via the bus 224.

The processing apparatus 212 may include one or more processors having single or multiple processing cores. The processing apparatus 212 may include memory, such as a random-access memory device (RAM), flash memory, or another suitable type of storage device such as a non-transitory computer-readable memory. The memory of the processing apparatus 212 may include executable instructions and data that can be accessed by one or more processors of the processing apparatus 212. For example, the processing apparatus 212 may include one or more dynamic random access memory (DRAM) modules, such as double data rate synchronous dynamic random-access memory (DDR SDRAM). In some implementations, the processing apparatus 212 may include a digital signal processor (DSP). In some implementations, the processing apparatus 212 may include an application specific integrated circuit (ASIC). For example, the processing apparatus 212 may include a custom image signal processor.

The image sensor 214 may be configured to detect light of a certain spectrum (e.g., the visible spectrum or the infrared spectrum) and convey information constituting an image as electrical signals (e.g., analog or digital signals). For example, the image sensor 214 may include CCDs or active pixel sensors in a CMOS. The image sensor 214 may detect light incident through a respective lens (e.g., a fisheye lens). In some implementations, the image sensor 214 includes digital-to-analog converters.

The communications interface 218 may enable communications with a personal computing device (e.g., a smartphone, a tablet, a laptop computer, or a desktop computer). For example, the communications interface 218 may be used to receive commands controlling image capture and processing in the image capture device 210. For example, the communications interface 218 may be used to transfer image data to a personal computing device. For example, the communications interface 218 may include a wired interface, such as a high-definition multimedia interface (HDMI), a universal serial bus (USB) interface, or a FireWire interface. For example, the communications interface 218 may include a wireless interface, such as a Bluetooth interface, a ZigBee interface, and/or a Wi-Fi interface.

The user interface 220 may include an LCD display for presenting images and/or messages to a user. For example, the user interface 220 may include a button or switch enabling a person to manually turn the image capture device 210 on and off. For example, the user interface 220 may include a shutter button for snapping pictures.

The battery 222 may power the image capture device 210 and/or its peripherals. For example, the battery 222 may be charged wirelessly or through a micro-USB interface (not shown).

Referring next to FIG. 2B, another image capture system 230 is shown. The image capture system 230 includes an image capture device 240 and a personal computing device 260 that communicate via a communications link 250. The image capture device 240 may, for example, be the image capture device 100 shown in FIGS. 1A-D. The personal computing device 260 may, for example, be the user interface device described with respect to FIGS. 1A-D.

The image capture device 240 includes an image sensor 242 configured to capture images. The image capture device 240 includes a communications interface 246 configured to transfer images via the communication link 250 to the personal computing device 260.

The personal computing device 260 includes a processing apparatus 262 that is configured to receive, using the communications interface 266, images from the image sensor 242. The processing apparatus 262 may be configured to perform image signal processing (e.g., filtering, tone mapping, stitching, and/or encoding) to generate output images based on image data from the image sensor 242.

The image sensor 242 is configured to detect light of a certain spectrum (e.g., the visible spectrum or the infrared spectrum) and convey information constituting an image as electrical signals (e.g., analog or digital signals). For example, the image sensor 242 may include CCDs or active pixel sensors in a CMOS. The image sensor 242 may detect light incident through a respective lens (e.g., a fisheye lens). In some implementations, the image sensor 242 includes digital-to-analog converters. Image signals from the image sensor 242 may be passed to other components of the image capture device 240 via a bus 248.

The communications link 250 may be a wired communications link or a wireless communications link. The communications interface 246 and the communications interface 266 may enable communications over the communications link 250. For example, the communications interface 246 and the communications interface 266 may include an HDMI port or other interface, a USB port or other interface, a FireWire interface, a Bluetooth interface, a ZigBee interface, and/or a Wi-Fi interface. For example, the communications interface 246 and the communications interface 266 may be used to transfer image data from the image capture device 240 to the personal computing device 260 for image signal processing (e.g., filtering, tone mapping, stitching, and/or encoding) to generate output images based on image data from the image sensor 242.

The processing apparatus 262 may include one or more processors having single or multiple processing cores. The processing apparatus 262 may include memory, such as RAM, flash memory, or another suitable type of storage device such as a non-transitory computer-readable memory. The memory of the processing apparatus 262 may include executable instructions and data that can be accessed by one or more processors of the processing apparatus 262. For example, the processing apparatus 262 may include one or more DRAM modules, such as DDR SDRAM.

In some implementations, the processing apparatus 262 may include a DSP. In some implementations, the processing apparatus 262 may include an integrated circuit, for example, an ASIC. For example, the processing apparatus 262 may include a custom image signal processor. The processing apparatus 262 may exchange data (e.g., image data) with other components of the personal computing device 260 via a bus 268.

The personal computing device 260 may include a user interface 264. For example, the user interface 264 may include a touchscreen display for presenting images and/or messages to a user and receiving commands from a user. For example, the user interface 264 may include a button or switch enabling a person to manually turn the personal computing device 260 on and off In some implementations, commands (e.g., start recording video, stop recording video, or snap photograph) received via the user interface 264 may be passed on to the image capture device 240 via the communications link 250.

FIGS. 3A-D are isometric views of an example of a housing or frame 300 for securing and expanding functionality of an image capture device, such as the image capture device 100 of FIGS. 1A-1D or the image capture devices 210, 240 of FIGS. 2A-2B. The frame 300 includes a frame body 302, a frame communication interface 304, a frame hinge mechanism 306, a frame latch mechanism 308, frame button interfaces 310, frame cold shoes 312 that receive imaging accessories 314, one or more integrated frame accessories 316, and one or more openings 318 configured to accommodate various features of an image capture device, such as mounts, lenses, displays, etc.

Figure 3A:
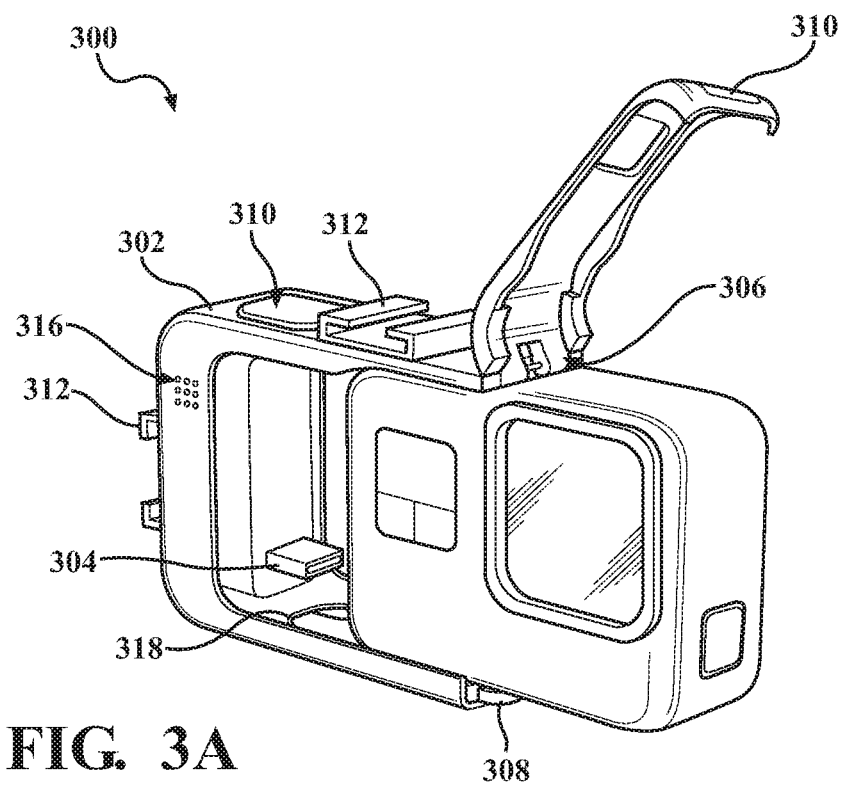
FIGS. 3A-D are isometric views of an example of a housing or frame for securing and expanding functionality of an image capture device.
Figure 3B:
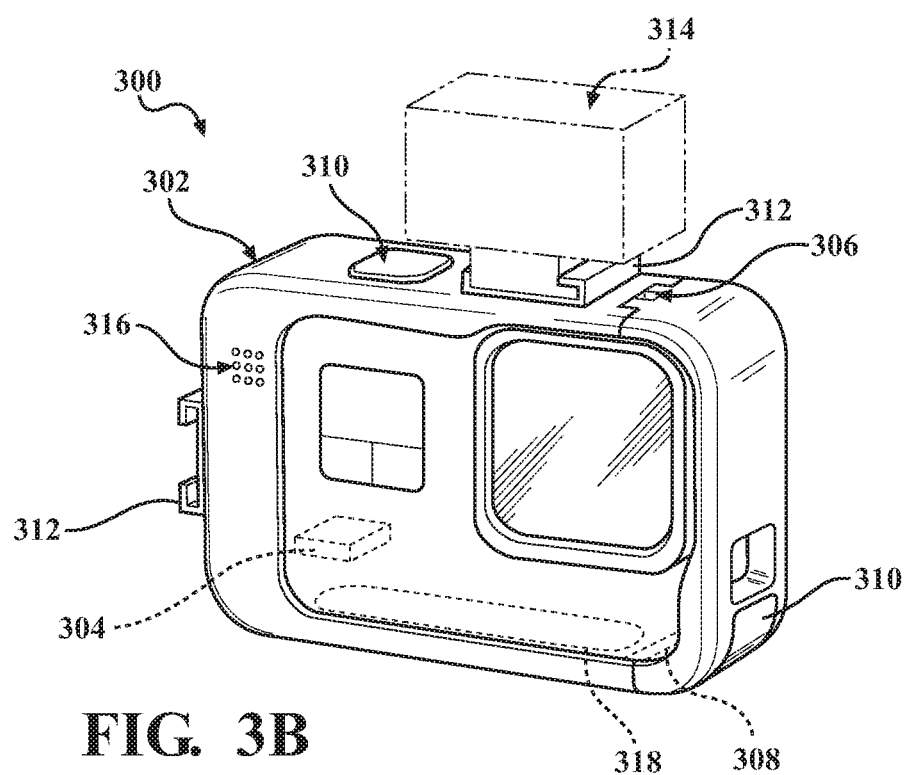
Figure 3C:
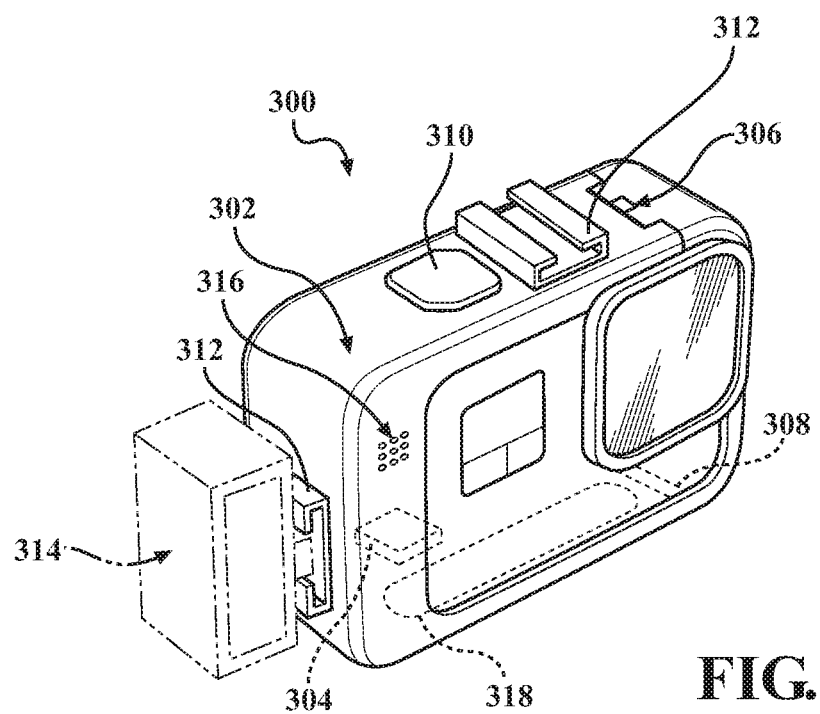
Figure 3D:
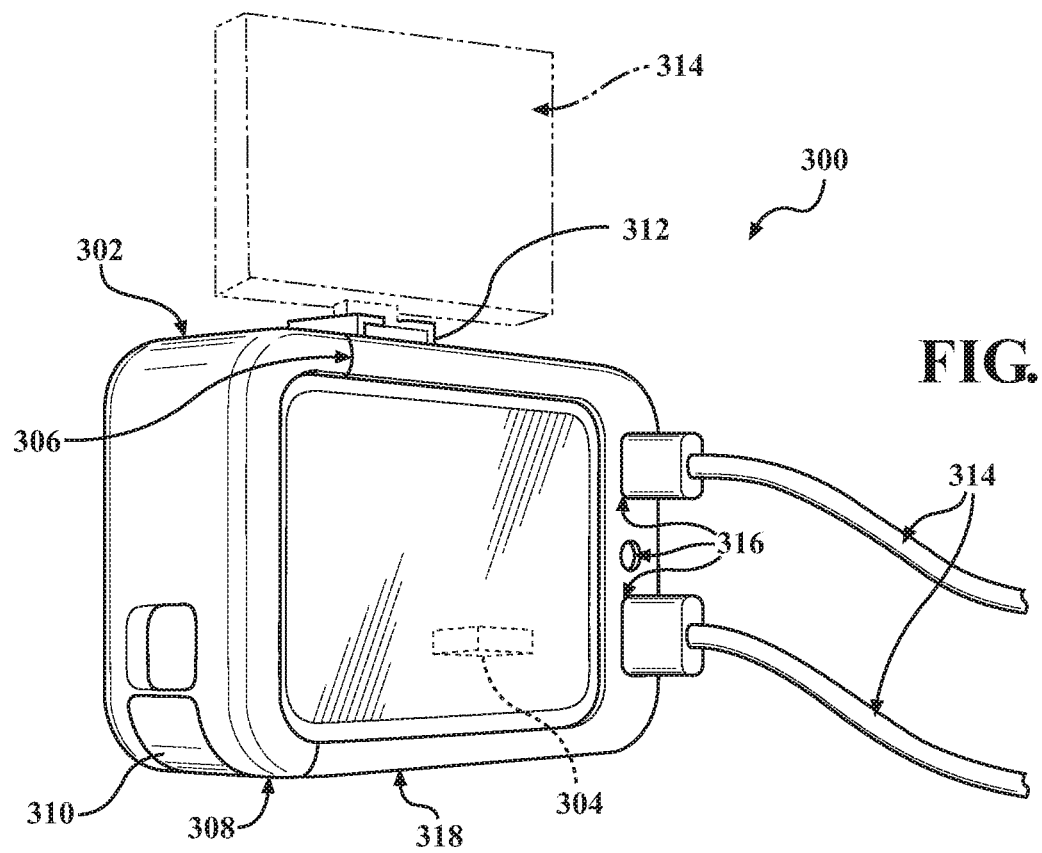

The frame body 302 can engage sides of a housing or body of an image capture device (e.g, the body 102 of the image capture device 100) when an access door of the image capture device is in the removed position (e.g., the removable door 115 of the image capture device 100 has been removed by a user of the image capture device 100). The frame body 302 has an open position for slidably receiving and removing the image capture device as shown in FIG. 3A. The frame body 302 also has a closed position for securing the image capture device within the frame body 302 as shown in FIGS. 3B-3D.

The frame communication interface 304 slidably mates with an imaging communication interface of the image capture device (e.g. the I/O interface 114 of the image capture device 100) when the image capture device is secured within the frame body 302. The mated interfaces (e.g. the frame communication interface 304 and the I/O interface 114 of the image capture device 100) facilitate power and data communications between the frame 300 and the image capture device (e.g., the image capture device 100).

The frame hinge mechanism 306 and the frame latch mechanism 308 allow the frame to move between the open position and the closed position. Though shown as movable between these positions using, for example, the frame button interface 310, a variety of mechanisms may be employed to open one or more sides of the frame body 302 to allow an image capture device to be slidably (and/or rotatably) inserted and removed.

The frame button interfaces 310 include both physical buttons (e.g., a button that opens the frame latch mechanism 308) and covers or other engageable surfaces that allow a user to interact with corresponding interfaces (e.g., the buttons 110) of the image capture device (e.g., the image capture device 100).

The frame cold shoes 312 secure imaging accessories 314 to the frame body 302. The imaging accessories 314 are shown in dotted line to indicate that both a form factor and a type of the imaging accessories 314 may vary or change. As shown in FIGS. 3B-3D, the imaging accessories 314 can include microphones, displays, and lighting accessories. Other types of imaging accessories 314 (not shown) may also be secured to the frame body 302 using the cold shoes 312 (or other mounting mechanisms). The imaging accessories 314 are intended to expand capabilities of the imaging device secured within the frame 300.

For example, when the imaging accessories 314 include a display (e.g., as shown in an attached location in FIG. 3D), the display may be coupled both mechanically and electronically to the frame 300 to allow a user to preview footage captured by the image capture device secured within the frame 300 in either a mirror-based or selfie-based orientation. As such, the display can add functionality to an image capture device that does not have a built-in display or can add a secondary display to an image capture device that has a single built-in display. The display can include a display screen (e.g., an LCD screen) and integrated display control logic for adding display functions to the image capture device. The display can be used to show an image or video currently in view of a camera lens of the image capture device secured in the frame 300, for example, to serve in a preview or selfie mode. The display can also allow a user to view stored images or videos associated with the image capture device.

In another example, when the imaging accessories 314 include a microphone (e.g., as shown in an attached location in FIG. 3B), the microphone can be used to capture audio data/information. The audio captured by the microphone serving as an imaging accessory 314 can be coordinated with video captured by the image capture device secured in the frame 300. The microphone could also be configured to capture audio without corresponding video.

The frame 300 also includes various frame accessories 316 that are integrated into the frame body 302. The frame accessories 316 can communicate with the image capture device (e.g., the image capture device 100) through mated interfaces (e.g., the I/O interface 114 and the frame communication interface 304) when the image capture device is secured within the frame 300. The frame accessories 316 can include integrated microphones (e.g., as shown in FIGS. 3A-3C). The integrated microphones can be housed within the frame body 302 with access holes as shown or can be formed as part of the frame body 302, for example, using alternative materials suitable for an exterior of a microphone (not shown). The microphones that serve as integrated frame accessories 316 can be multi-directional, can have a variety of sensitivity thresholds, and/or can work together with microphones that form part of the image capture device secured within the frame 300 to provide a complex audio capture capability.

The frame accessories 316 can also include frame I/O interfaces that can accept various audio, visual, and/or or data-transfer cables serving as imaging accessories 314 (e.g., as shown in FIG. 3D). The audio, visual, or data-transfer cables allow communication with various user interface devices and/or other imaging accessories 314, such as imaging accessories 314 coupled to the frame 300 using the cold shoes 312. The frame 300 can also include appropriate circuitry to prioritize data transfer and conversion of video signals and audio signals when the frame I/O interfaces are in use as frame accessories 316. In one example, when the frame accessories 316 include frame I/O interfaces (e.g., as shown in FIG. 3D), a coupled imaging accessory 314 can be a microphone (e.g., as shown in FIG. 3B), and an audio cable that communicates with the microphone can be coupled to the frame I/O interface.

The frame body 302 can define the one or more frame openings 318. Though a single frame opening 318 is designated in FIGS. 3A-3D, multiple frame openings 318 can be designed as part of the frame 300 to allow access to various components of the image capture device secured within the frame 300. In the examples of FIGS. 3A-3D, the frame opening 318 at the bottom of the frame allows a mounting mechanism (not shown) to pass through the frame body 302 to couple with the image capture device secured within the frame 300.

Figure 4A:
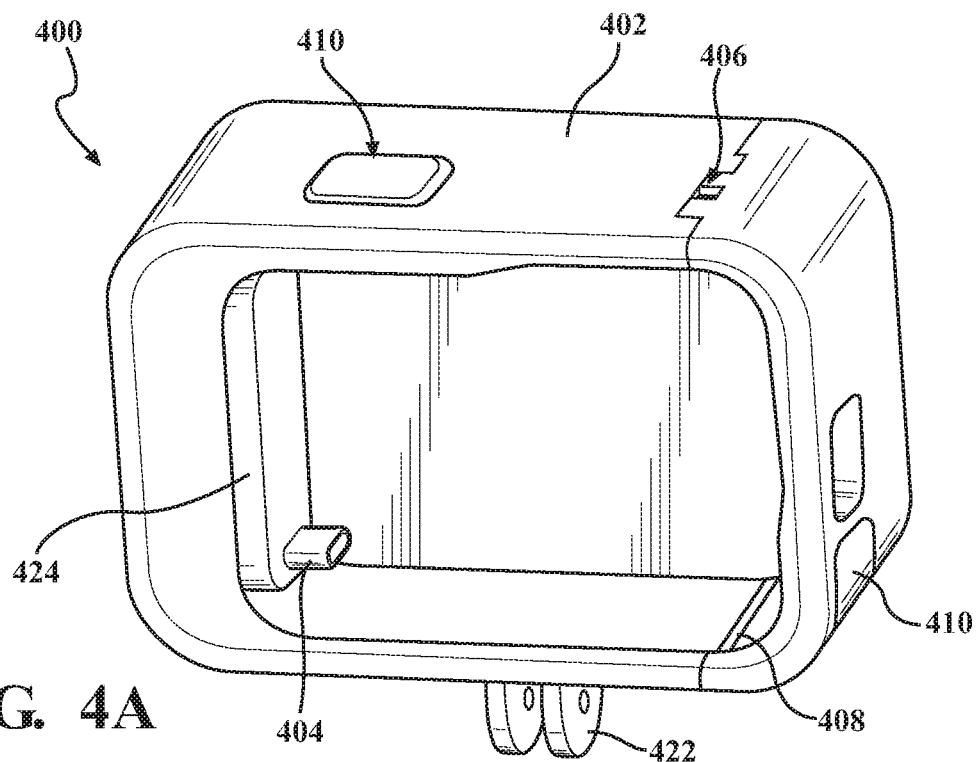
FIGS. 4A-C are isometric and exploded views of another example of a housing or frame for securing and expanding functionality of an image capture device.
Figure 4B:
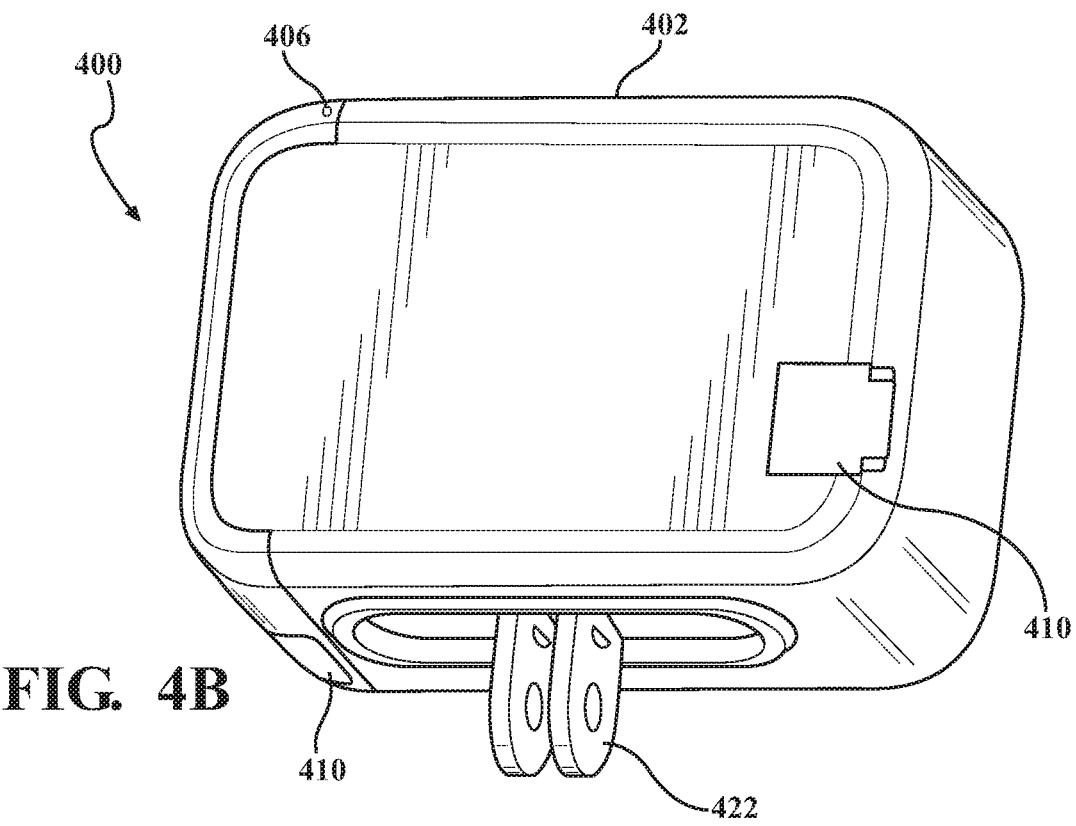
Figure 4C:
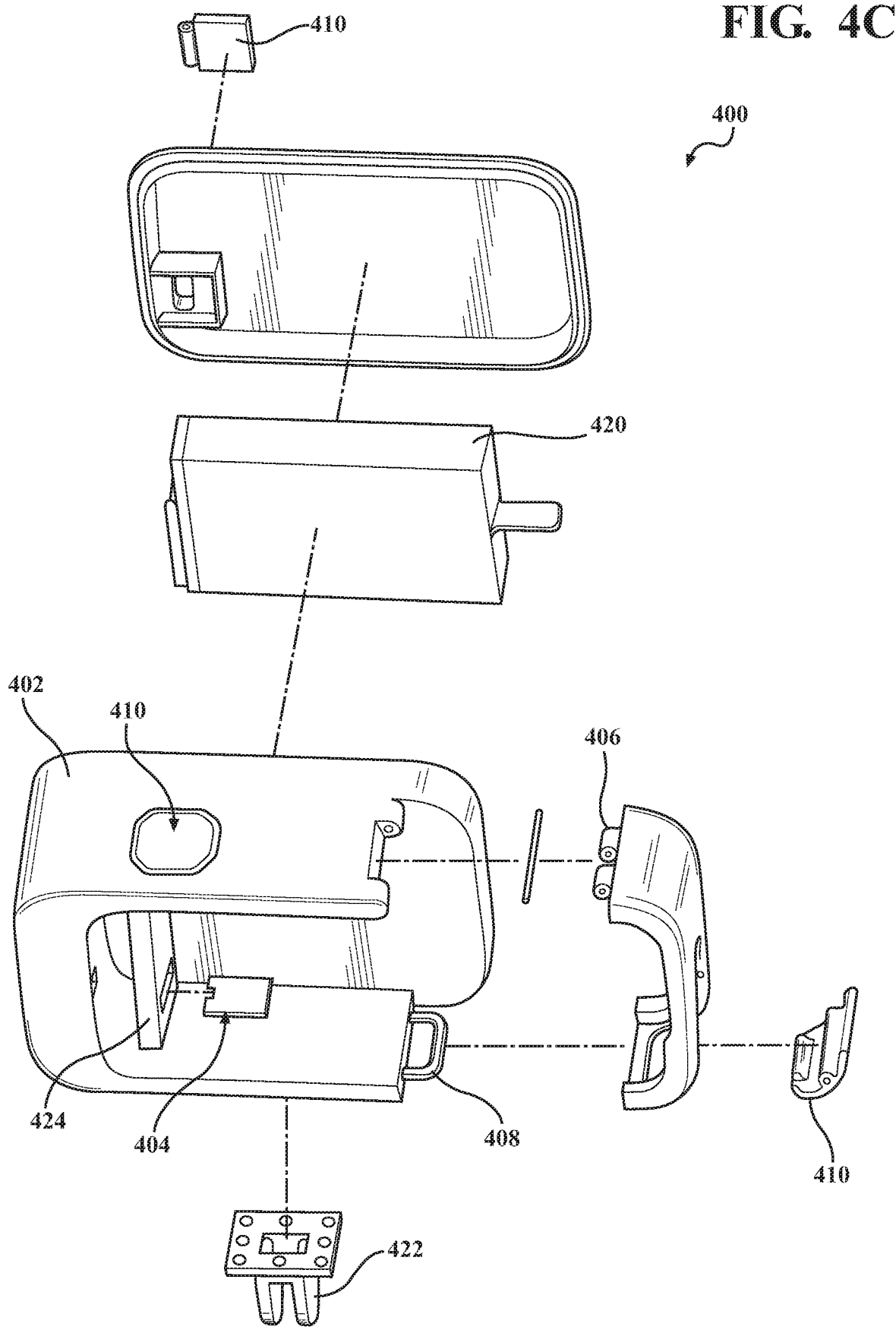

FIGS. 4A-C are isometric and exploded views of another example of a housing or frame 400 for securing and expanding functionality of an image capture device, such as the image capture device 100 of FIGS. 1A-1D or the image capture devices 210, 240 of FIGS. 2A-2B. The frame 400 includes a frame body 402, a frame communication interface 404, a frame hinge mechanism 406, a frame latch mechanism 408, frame covers or button interfaces 410, an integrated frame accessory, for example, in the form of a battery 420, a frame mount mechanism 422, and a frame interface seal 424.

The frame body 402 can engage sides of a housing or body of an image capture device (e.g, the body 102 of the image capture device 100) when an access door of the image capture device is in the removed position (e.g., the removable door 115 of the image capture device 100 has been removed by a user of the image capture device 100). The frame body 402 has an open position for slidably receiving and removing the image capture device (not shown, but similar to the open position of the frame 300 shown in FIG. 3A). The frame body 402 also has a closed position for securing the image capture device within the frame body 402 (e.g, the closed position shown in FIGS. 4A-4B).

The frame communication interface 404 slidably mates with an imaging communication interface of the image capture device (e.g. the I/O interface 114 of the image capture device 100) when the image capture device is secured within the frame body 402. The mated interfaces (e.g. the frame communication interface 404 and the I/O interface 114 of the image capture device 100) facilitate power and data communications between the frame 400 and the image capture device (e.g., the image capture device 100).

The frame hinge mechanism 406 and the frame latch mechanism 408 allow the frame to move between the open position and the closed position. Though shown as movable between these positions using, for example, the button interface 410 to disengage the frame latch mechanism 408, a variety of mechanisms may be employed to open one or more sides of the frame body 402 to allow an image capture device to be slidably (and/or rotatably) inserted and removed.

The frame button interfaces 410 include both physical buttons (e.g., a button that opens the frame latch mechanism 408 as shown in FIGS. 4A-4C), covers (e.g., a cover that acts as a waterproof door to an I/O interface as shown in FIGS. 4B-4C), and other engageable surfaces that allow a user to interact with corresponding interfaces (e.g., the buttons 110) of the image capture device (e.g., the image capture device 100).

As best shown in FIG. 4C, a frame accessory in the form of the battery 420 is integrated into the frame body 402. The battery 420 extends along a back surface or rear face of the image capture device secured within the frame 400. The battery 420 can add functionality in the form of longer battery life to the image capture device (e.g., the image capture device 100) through power transfer using mated interfaces (e.g., the I/O interface 114 and the frame communication interface 404) when the image capture device is secured within the frame 400. In addition, the battery 420 can be used to provide heat to the secured image capture device in situations of cold temperatures, for example, when a user of the image capture device is skiing or snowboarding, improving functionality of the image capture device in low temperature situations. The use of two batteries (that present within the image capture device and the battery 420 of the frame 400) thus extends duration of use capability for the secured image capture device.

The frame body 402 includes the frame mount mechanism 422. The frame mount mechanism 422 may include a pair of fingers that fit with complementary fingers on a complementary mount mechanism (not shown) to allow a hinge-type engagement between the mechanisms. The fingers of the frame mount mechanism 422 may be foldable and/or otherwise collapsible to minimize a profile of the frame 400. The frame mount mechanism 422 may be located in a position on the frame body 402 that accounts for a combined weight and/or center of gravity of the frame 400 and the secured image capture device. The frame mount mechanism 422 may also be located in a position on the frame body 402 that accounts for a physical structure (e.g., width, length, etc.) of various complementary mount mechanisms.

The frame mount mechanism 422 may further include conductive surfaces or conductive points disposed on surfaces of the fingers (not shown). These conductive surfaces or conductive points can facilitate transmission of power through the fingers to, for example, the battery 420 of the frame 400 from another external power source, such as another battery associated with a device coupled to the complementary mount mechanism. In this manner, additional runtime capability can be added to the image capture device secured within the frame 400.

The frame body 402 includes the frame interface seal 424. The frame interface seal 424 can provide sealing and/or waterproofing between the frame body 402 and the secured image capture device at the location of the frame communication interface 404. For example, the frame communication interface 404 can be mated to the I/O interface 114 of the image capture device 100 of FIGS. 1A-1D when the removable door 115 has been removed from the image capture device 100, and the frame interface seal 424 can provide a water-resistant or water-proof seal between the frame body 402 and the image capture device 100 so that no water impacts the mated interface 114, 404 or other components within the body 102 of the image capture device 100.

Figure 5A:
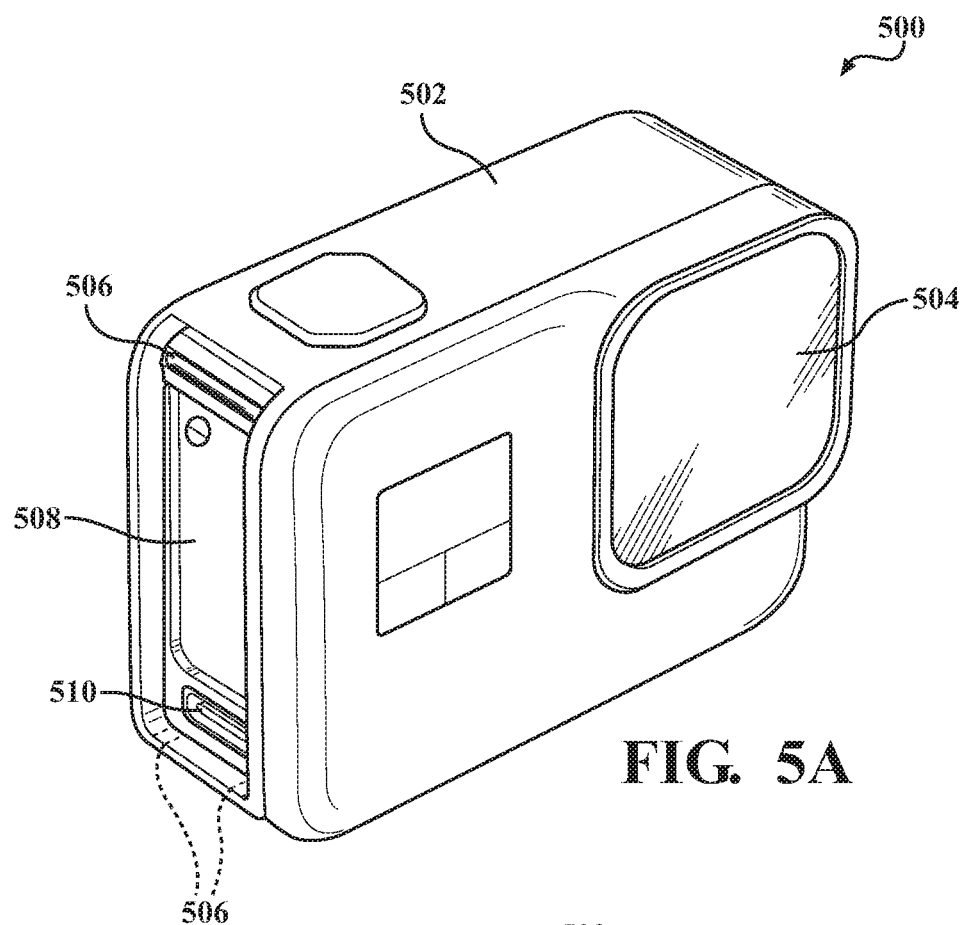
FIGS. 5A-C are isometric and sectional views of an example of an image capture system including an image capture device and an expansion module.
Figure 5B:
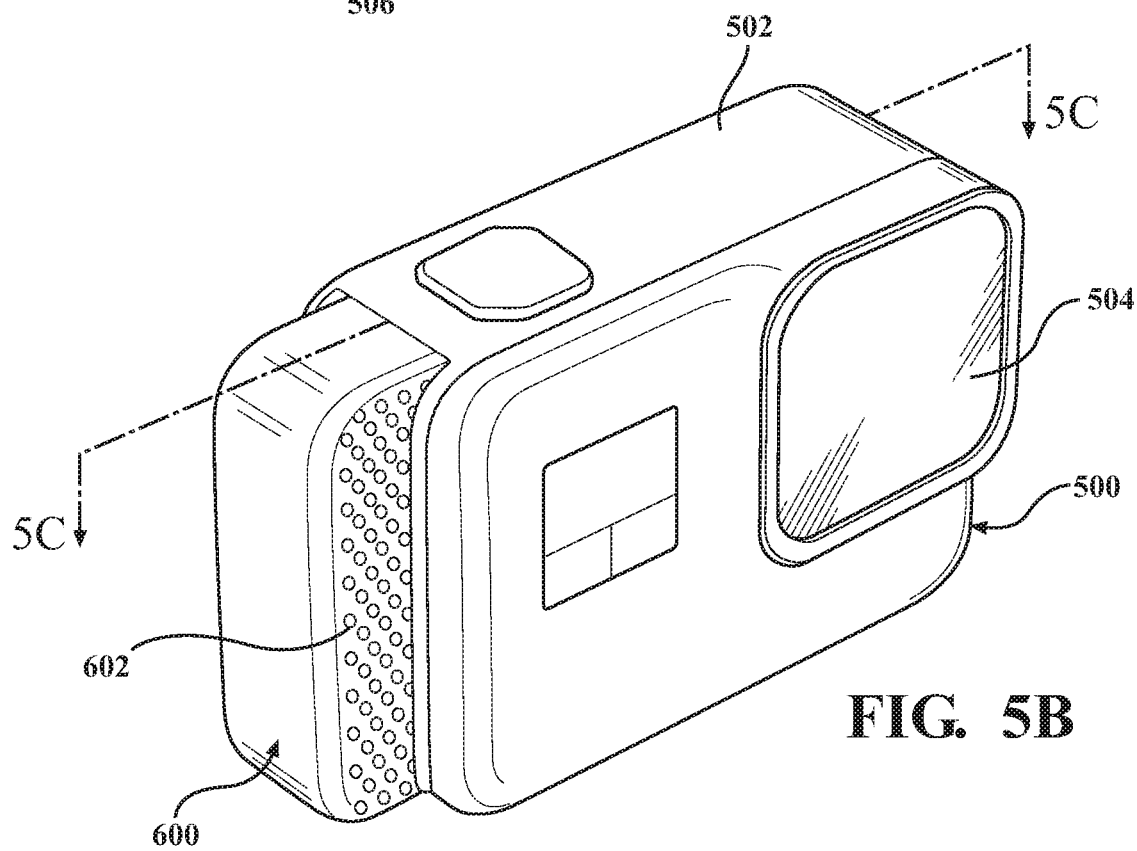
Figure 5C:
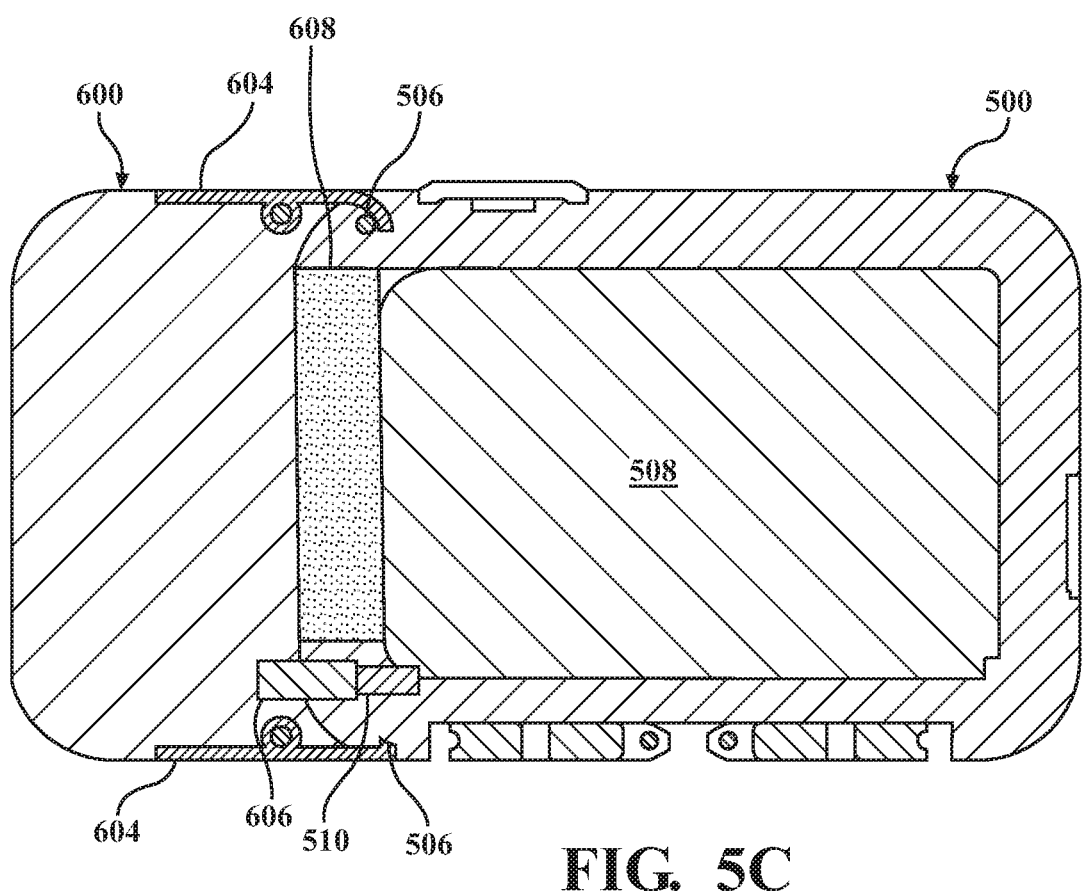

FIGS. 5A-C are isometric (FIGS. 5A and 5B) and sectional views (FIG. 5C) of an example of an image capture system including an image capture device 500 and an expansion module 600.

The image capture device 500 can be similar to the image capture device 100. For example, the image capture device 500 can include a body or housing 502 having a lens 504 structured on a front surface of the housing 502, various indicators on the front of the surface of the housing 502 (such as LEDs, displays, and the like), various input mechanisms (such as buttons, switches, and touch-screen mechanisms), and electronics (e.g., imaging electronics, power electronics, etc.) internal to the housing 502 for capturing images via the lens 504 and/or performing other functions. The image capture device 500 may be configured to capture images and video and to store captured images and video for subsequent display or playback. Other features of the image capture device 500 are not described here, as the description below is focused on the interface between the image capture device 500 and the expansion module 600.

The image capture device 500 in the example in FIGS. 5A-5C is shown without a removable access door, that is, the access door has been removed to allow for the expansion module 600 to be coupled to the image capture device 500 as shown in FIGS. 5B-5C. When present, the access door can be removably secured in a closed position, for example, using access fastening structures (e.g., hinge structures or mechanisms and/or latch structures or mechanisms) that engage retention features 506 of the housing 502 of the image capture device 500.

The retention features 506 integrated into the housing 502 of the image capture device 500 can include hinge structures, such as pins, bars, clamps, etc. The retention features 506 can also include depressions, cavities, or channels defined in the housing 502 of the image capture device 500. These are only examples of the retention features 506. Other types of integrated retention features 506 (not shown) on the housing 502 of the image capture device 500 are also possible.

As shown in FIGS. 5A and 5C, the image capture device 500 can include a battery 508 and an imaging communication interface 510 that can be covered by the removable access door. In the closed position of the access door (not shown), the user is prohibited access to the battery 508 and the imaging communication interface 510 by the access door. In the removed position of the access door (e.g., as shown in FIG. 5A), the access fastening structures are separated from the retention features 506 and the user is allowed access to the battery 508 and the imaging communication interface 510.

As shown in FIG. 5B, the expansion module 600 includes an expansion accessory 602, for example, a microphone with enhanced audio capture capability. Though a microphone is shown in FIG. 5B, other expansion accessories 602 are possible, such as multiple microphones with directional capture capabilities, one or more audio-visual interfaces, one or more lighting accessories, and/or one or more expansion batteries. Other types of expansion accessories 602 are also possible. The expansion accessories 602 can be integrated into the expansion module 600 in a manner similar to that described in respect to the frame accessories 316 of FIGS. 3A-3D.

As shown in the section of FIG. 5C, the expansion module 600 includes expansion fastening structures 604 that removably couple the expansion module 600 to the retention features 506 of the image capture device 500 in place of the access fastening structures when the access door is in the removed position. The expansion fastening structures 604 can includes hinge structures, latch structures, or other physical mechanisms that allow the expansion module 600 to be removably coupled to the retention features 506 of the image capture device 500.

For example, the topmost expansion fastening structure 604 shown in FIG. 5C can have a hook-shaped tip or end that partially wraps around a bar or pin serving as the retention feature 506 on the topmost side of the image capture device 500. In another example, the bottommost expansion fastening structure 604 shown in FIG. 5C can have a notch-shaped or arrow-shaped tip or end that fits into a detent or channel serving as the retention feature 506 on the bottommost side of the image capture device 500. Opposite ends of the expansion fastening structures 604 can be depressed by a user to disengage the hook-shaped, notch-shaped, or arrow-shaped ends from the retention features 506 on the image capture device 500 using a see-saw or pivot mechanism as shown. Other expansion fastening structures 604 and complementary retention features 506 are also possible.

As shown in the section of FIG. 5C, the expansion module 600 includes an expansion communication interface 606 that slidably mates with the imaging communication interface 510 of the image capture device 500. The expansion communication interface 606 slidably mates with the imaging communication interface 510 concurrently with the expansion fastening structures 604 coupling the retention features 506 of the housing 502 of the image capture device 500. The mated interfaces 510, 606 facilitate power and data communications between the expansion module 600 and the image capture device 500. In addition, the mated interfaces 510, 606 provide structural support to the physical coupling of the expansion module 600 and the image capture device 500.

As shown in the section of FIG. 5C, the expansion module 600 includes a seal 608 that sits between the expansion module 600 and the image capture device 500 when the expansion module 600 is coupled to the image capture device 500. The seal 608 can provide sealing and/or waterproofing between the expansion module 600 and the image capture device 500 at the location of the battery 508 and/or mated interfaces 510, 606 so that no water impacts the mated interface 510, 606, the expansion accessory(ies) 602 in the expansion module 600, or any other components within the housing 502 of the image capture device 500.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A frame for an image capture device, comprising:
a frame body configured to receive and secure the image capture device;
a frame I/O interface configured to mate with an imaging I/O interface of the image capture device when the image capture device is secured within the frame body;
a frame interface seal configured to provide waterproofing between the frame body and the image capture device when the frame I/O interface and the imaging I/O interface are mated; and
a frame accessory integrated into the frame body and configured to communicate with the image capture device when the frame I/O interface and the imaging I/O interface are mated,
wherein the frame accessory includes two or more additional frame I/O interfaces that accept audio, visual, and/or data-transfer cables,
wherein the frame accessory includes a frame microphone disposed on a surface of the frame body that is orthogonal to a surface of the image capture device that includes an image capture device microphone when the image capture device is secured in the frame body such that the frame provides multi-directional audio capture capabilities to the image capture device, and
wherein the frame microphone has varied sensitivity thresholds.

2. The frame of claim 1, wherein the frame accessory includes a frame battery, and wherein the frame battery increases battery life for the image capture device through power transfer using the mated frame I/O interface and the imaging I/O interface when the image capture device is secured within the frame.

3. The frame of claim 1, wherein one of the two or more additional frame I/O interfaces is configured to facilitate one or more of power and data communications between the frame and an imaging accessory.

4. The frame of claim 3, comprising:
a cold shoe coupled to the frame body and configured to secure the imaging accessory to the frame body.

5. The frame of claim 3, wherein the imaging accessory includes one or more of a display or a lighting accessory.

6. The frame of claim 5, wherein the imaging accessory includes the display, and wherein when the display is coupled to the frame in a selfie-based orientation, the display is positioned to allow a user to preview footage of the user being captured by the image capture device.

7. The frame of claim 1, further comprising:
frame button interfaces disposed on the frame body that cover corresponding interfaces of the image capture device and allow a user to interact with the corresponding interfaces.

8. The frame of claim 1, further comprising:
an opening in the frame body configured to allow a mounting mechanism for the image capture device to pass through the frame body.

9. A frame for an image capture device, comprising:
a frame body configured to receive and secure the image capture device;
a frame microphone having multi-directional capabilities and varied sensitivity thresholds, the frame microphone configured to supplement audio captured by an image capture device microphone that forms part of the image capture device secured within the frame;

a frame communication interface,
  wherein the frame communication interface is configured to slidably mate with an imaging communication interface of the image capture device when the image capture device is secured within the frame body, and
  wherein when mated, the frame communication interface and the imaging communication interface facilitate one or more of power and data communications between the frame and the image capture device; and two or more frame accessory communication interfaces,
  wherein the frame accessory communication interfaces are configured to mate with corresponding imaging accessory communication interfaces associated with respective imaging accessories through use of cables,
  wherein when mated by the cables, the frame accessory communication interfaces and the respective imaging accessory communication interfaces facilitate one or more of power and data communications between the frame or the image capture device and the imaging accessories, and
  wherein the two or more frame accessory communication interfaces include at least a USB-type interface and an audio-jack-type interface.

10. The frame of claim 9, wherein the frame body is configured to engage four sides of a housing of the image capture device, wherein the frame body has an open position for slidably receiving and removing the image capture device, and wherein the frame body has a closed position for securing the four sides of the image capture device within the frame body.

11. The frame of claim 9, further comprising:
a frame accessory disposed in the frame body, wherein when mated, the frame communication interface and the imaging communication interface facilitate one or more of power and data communications between the frame accessory and the image capture device.

12. The frame of claim 11, wherein the frame accessory includes a frame battery.

13. The frame of claim 12, wherein the frame battery increases battery life for the image capture device through power transfer using the mated frame I/O interface and the imaging I/O interface when the image capture device is secured within the frame.

14. The frame of claim 9, wherein the imaging accessories include one or more of a display, a battery, or a lighting accessory.

15. The frame of claim 14, wherein the imaging accessories include the display, and wherein when the display is coupled to the frame in a selfie-based orientation, the display is positioned to allow a user to preview footage of the user being captured by the image capture device.

16. A system, comprising:
an image capture device, comprising:
  a housing;
  an imaging communication interface; and
  an access door removably coupled to the housing such that a user is allowed access to the imaging communication interface when the access door is in an open position or a removed position; and
a frame, comprising:
  a frame body configured to receive and secure the image capture device,
    wherein the frame body has an open position for slidably receiving and removing the image capture device, and
    wherein the frame body has a closed position for securing the image capture device within the frame body when the access door is in the removed position;
  a frame accessory disposed in the frame body, wherein the frame accessory includes a frame microphone configured to capture audio directed to a surface of the frame body that is orthogonal to a surface of the image capture device that includes an image capture device microphone to support directional audio capture capabilities;
  a frame communication interface,
    wherein the frame communication interface aligns with the imaging communication interface when the image capture device is secured within the frame body, and
    wherein the aligned communication interfaces facilitate power and data communications between the frame accessory and the image capture device; and
  two or more frame I/O interfaces disposed in the frame body, wherein the two or more frame I/O interfaces accept audio, visual, and/or data-transfer cables to mate with corresponding imaging accessory communication interfaces associated with imaging accessories.

17. The system of claim 16, wherein the imaging accessories includes one or more of a microphone, a lighting accessory, a display, or a battery.

18. The system of claim 17, wherein the imaging accessories include the display, and wherein when the display is coupled to the frame in a selfie-based orientation, the display is positioned to allow a user to preview footage of the user being captured by the image capture device.

19. The system of claim 16, wherein the frame includes a cold shoe configured to secure one or more of the imaging accessories to the frame body.

20. The system of claim 16, wherein the frame body defines an opening configured to allow a mounting mechanism for the image capture device to pass through the frame body.

* * * * *